United States Patent [19]

Lagerwall et al.

[11] 4,067,556
[45] Jan. 10, 1978

[54] DEVICE FOR CONTOUR CUTTING OF METAL PLATES

[75] Inventors: Ralph Georg Torbjörn Lagerwall; Stanislaw Sarnik, both of Malmo, Sweden

[73] Assignee: Kockums Mekaniska Verkstads AB, Malmo, Sweden

[21] Appl. No.: 586,779

[22] Filed: June 13, 1975

[51] Int. Cl.² .................. B23K 37/00; B23K 37/04
[52] U.S. Cl. .................................. 266/65; 266/135
[58] Field of Search .............. 266/23 R, 48, 65, 135; 83/81, 82, 167; 104/1 R, 162; 105/7, 462

[56] References Cited

U.S. PATENT DOCUMENTS

| | | | |
|---|---|---|---|
| 3,666,249 | 5/1972 | MacLeod | 266/23 R X |
| 3,770,110 | 11/1923 | Boskovitch | 266/23 R X |
| 3,831,475 | 8/1974 | Bettcher | 83/167 X |

FOREIGN PATENT DOCUMENTS

| | | |
|---|---|---|
| 2,356,282 | 6/1974 | Germany. |

Primary Examiner—Roy Lake
Assistant Examiner—Paul A. Bell

[57] ABSTRACT

A device for contour cutting of metal plates comprises a cutting table for supporting horizontally plates to be contour cut, a contour cutting unit movable along the cutting table, and scrap receiving means for receiving the cut scrap beneath the cutting table. The scrap receiving means is movable by drive means in relation to the cutting table substantially in parallel to the moving path of the contour cut unit and in the moving direction thereof. The extension of the scrap receiving surface in a plane parallel to the supporting surface of the cutting table is larger than the extension in the same plane of the fall zone of cut scrap below the contour cutting unit, and the drive means is controlled to adjust the movement of the scrap receiving means according to the movement of the contour cutting unit in such a way that the fall zone of the cut scrap during the entire contour cutting operation will be maintained in a position within the borders of the scrap receiving surface.

14 Claims, 4 Drawing Figures

DEVICE FOR CONTOUR CUTTING OF METAL PLATES

The present invention relates to contour cutting of metal plates.

More particularly the invention relates to a device for contour cutting of metal plates comprising a cutting table for supporting horizontally plates to be contour cut, a contour cutting unit movable along the cutting table and having cutting nozzles for contour cutting of the plates, receiving means for receiving the cut scrap, which includes a receiving member disposed beneath the cutting table and providing a scrap receiving surface the extension of which in a plane parallel to the supporting surface of the cutting table is larger than the extension in the same plane of the fall zone of cut scrap below the contour cutting unit said receiving means being movable in relation to the cutting table in order to be brought by drive means to a dumping position at a scrap collecting container.

In the heavy engineering industry heavy plate material is being used extensively for construction elements. Particularly is this the case in the shipyard industry where plates form the basic constructive elements. The plates delivered from rolling mills do not satisfy a sufficient accuracy to size to be used directly, contour cutting of the plates to accurate dimensions being necessary. This operation is performed in industrial scale in special contour cutting machines which comprise normally a stationary cutting table and a contour cutting unit movable linearly along the cutting table.

An annoying problem in connection with prior art contour cutting machines is that of taking up the cut scrap formed during the contour cutting and falling down onto the bedding below the cutting table along the whole extent thereof. In order to prevent the cut off marginal strips from being too long and cumbersome it is common practice to divide these strips during the contour cutting operation into short pieces either manually by means of a torch or automatically by means of separate cutting nozzles forming part of the contour cutting unit. The marginal strips divided into short pieces as well as slag formed during the cutting form an elongated collection of scrap on the floor below and along the cutting table, and this scrap collection will grow in height as well as laterally during the contour cutting of a number of plates.

The pile of cut scrap having an unregular extension in height as well as laterally, which accrues gradually forms a troublesome obstacle for the staff working at the contour cutting plant, and requires an increased attention at movement along the cutting table and also increases the risk for accidents. The cut scrap therefore has to be removed from time to time. Normally this is done manually and is a time consuming, heavy and cumbersome work which may cause disturbances of the operations and therefore should be done when the contour cutting machine is out of service. The handling of the cut scrap in prior art contour cutting plants is an bothersome factor which essentially makes the automation of the contour cutting as well as the plate handling connected therewith more difficult such automation being desirable in an efficient manufacturing process.

An object of the present invention is to provide a contour cutting device in which it is possible to take up by simple means the cut scrap continuously in order to prevent such scrap from collecting below the cutting table, and to increase the automation of the working movements performed in contour cutting machines.

These objects are achieved according to the invention by a contour cutting device of the kind referred to wherein said scrap receiving means is movable by said drive means substantially in parallel to the moving path of the contour cutting unit and in the moving direction thereof said drive means being controlled to adjust the movement of the scrap receiving means according to the movement of the contour cutting unit in such a way that the fall zone of the cut scrap during the entire contour cutting operation will be maintained in a position within the borders of the scrap receiving member.

A preferred embodiment of the invention will be described below reference being made to the accompanying drawings in which FIG. 1 is a cross sectional view of a contour cutting device according to the invention;

Figure 1:
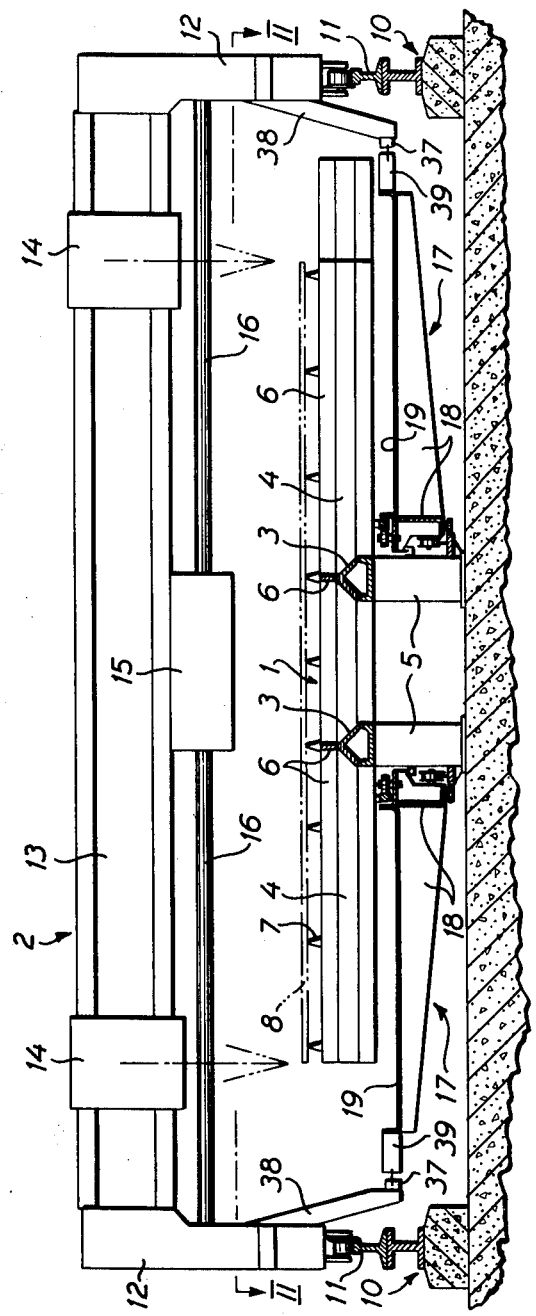

The contour cutting device disclosed in the drawings comprises a horizontal elongated cutting table 1 and a contour cutting carriage 2 spanning the cutting table, which is movable along said table. The contour cutting device preferably is housed in a tall building wherein there are provided lifting gears such as magnet traverses by means of which plates as well as scrap collecting containers may be moved to and from the device.

Figure 2:
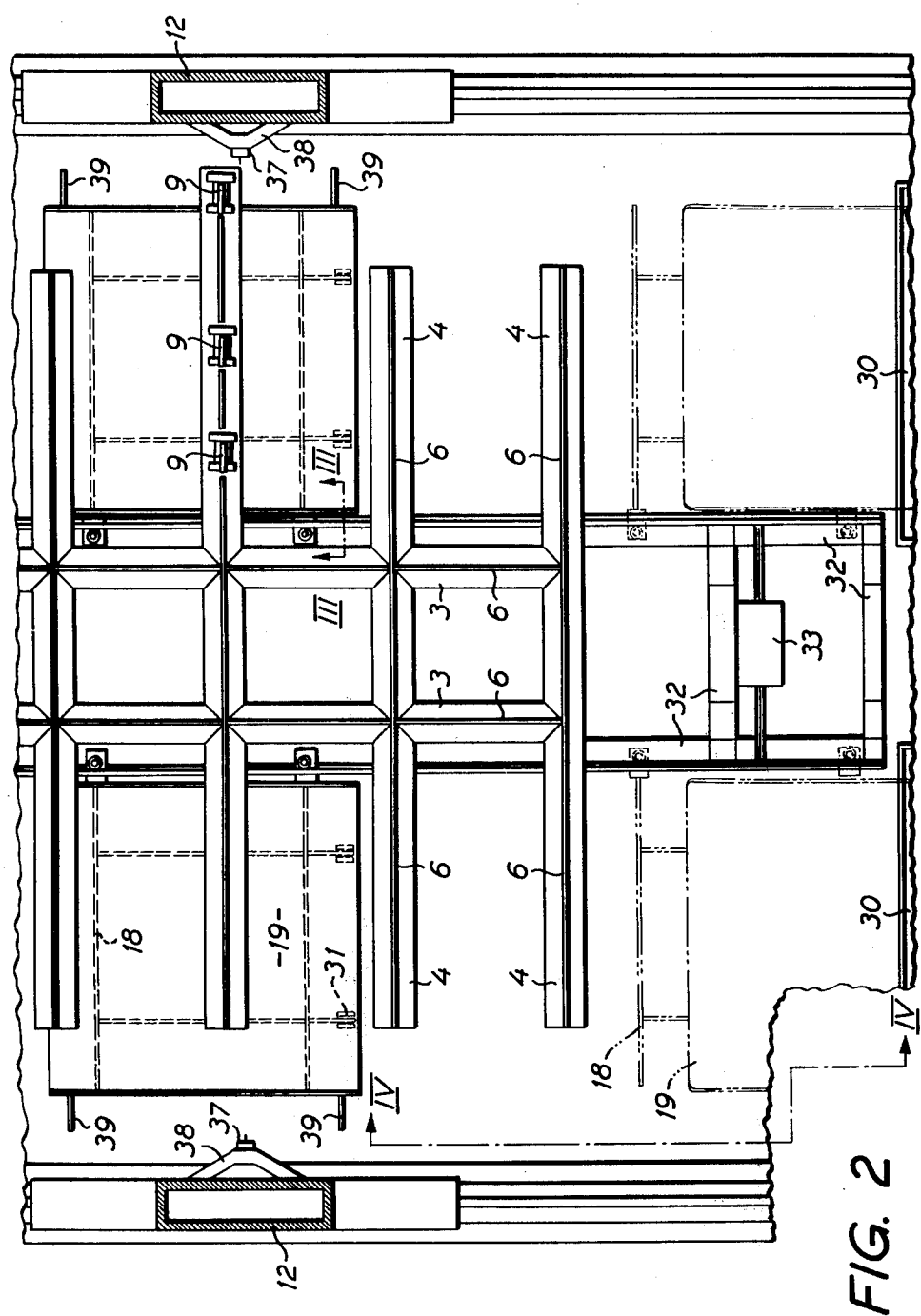
FIG. 2 is a horizontal sectional view according to line II — II in FIG. 1 at one end of the contour cutting device.

The cutting table 1 the construction of which will be seen particularly in FIGS. 1 and 2 comprises two longitudinal supporting beams 3 interconnected by means of a number of transverse supporting beams 4 which project at each side of the longitudinal supporting beams and define the width of the cutting table. The cutting table formed by said longitudinal and transverse beams is supported at a suitable working level over the bedding by means of a number of standards 5 which are fixedly anchored in the floor and are arranged under the longitudinal supporting beams. Each supporting beam is formed with angular upper sliding surfaces in order to prevent the cut scrap from collecting on the upper surfaces of the beams. Along the top portions of the supporting beams there are connected by welding flat iron bars 6 on which there are equally spaced a great number of riders 7 which form together a horizontal supporting surface for plates 8 to be contour cut. At least two transverse supporting beams which are spaced apart a relatively great distance in the longitudinal direction of the cutting table are provided with a number of hinged abutment lugs 9 against which a plate to be contour cut may be adjusted before the contour cutting operation is initiated. The number of abutment lugs 9 on a cross beam as well as the mutual spacing thereof is adapted to the width dimensions of the plates to be contour cut in the contour cutting device. When the plate is placed against the abutment lugs corresponding to the plate width no further adjustment will be necessary. There are of course corresponding abutment lugs also at one of the short sides of the cutting table for the adjustment of the plate in the longitudinal direction thereof. At least two of the transverse supporting beams provided with abutment lugs project a distance beyond the rest of the transverse supporting beams in order to enable also plates to be adjusted the width of which is greater than that of the table.

At each side of the cutting table 1 there are arranged tracks 10 provided with rails 11 on which the contour cutting carriage is movable. The contour cutting carriage comprises two vertical legs provided with driven wheels said legs being interconnected by a beam 13 spanning the cutting table 1. Beam 13 carries two contour cutting units 14 displaceable along the beam, which may be adjusted to the desired position along the beam over a plate placed on the cutting table. At the centre of beam 13 there is mounted a drive motor 15 which transmits over shafts 16 and suitable gearing the drive motion to traversing gears in the vertical carriage legs 12. The contour cutting units 14 are provided with contour cutting nozzles or torches as well as cutting nozzles or torches which divide, during the contour cutting, the marginal strips cut from plate 8 into short pieces by movement in the transverse direction of the cutting table. The cutting nozzles are indicated diagrammatically by vertical dash-and-dot arrows.

Figure 3:
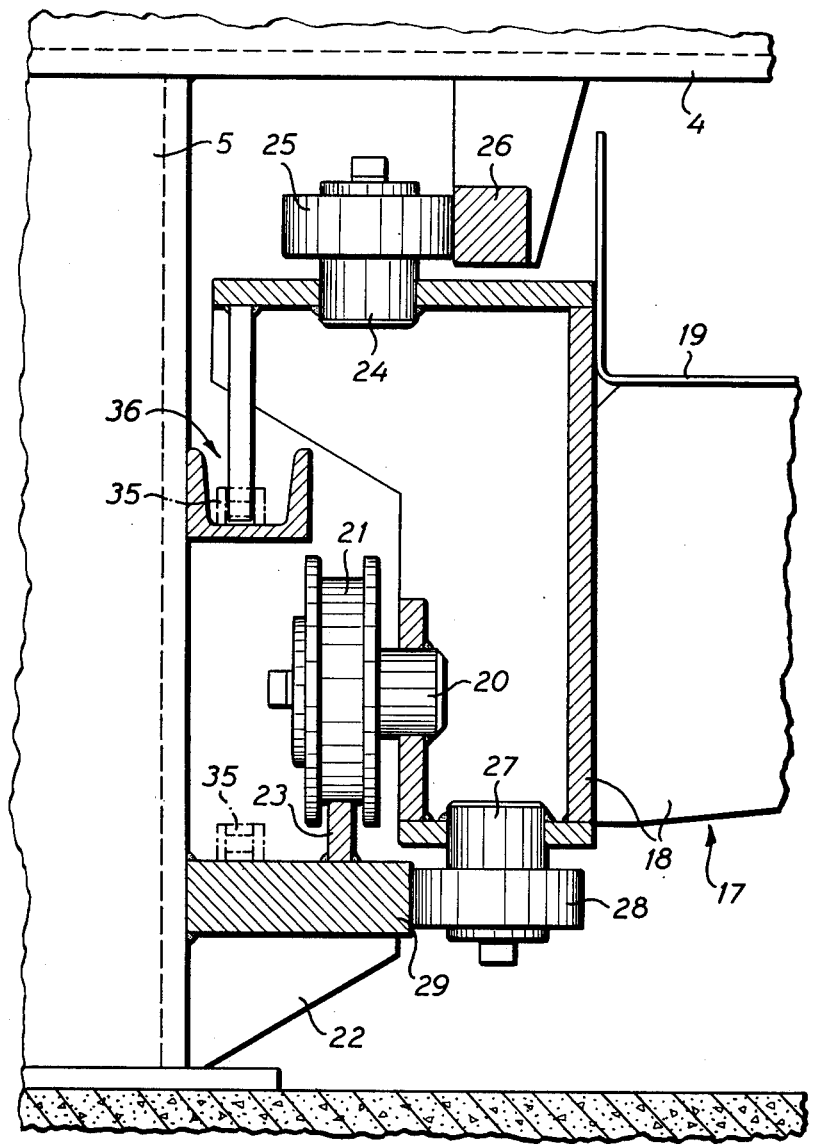
FIG. 3 is an enlarged cross sectional view according to line III — III in FIG. 2 showing details of the scrap receiving means according to the invention.

In order to prevent plate cut scrap as well as cut slag from falling down onto the floor below the cutting table the device according to the invention comprises scrap receiving means at each longitudinal side of the table for the reception of cut scrap falling down. Each scrap receiving means 17 comprises a frame 18 arranged below the cutting table 1 and movable in the longitudinal direction thereof said frame carrying a scrap receiving member 19 tiltable in relation to the frame. Frame 18 is also provided with two travelling wheels 21 rotatably mounted on horizontal shafts 20, which run on a track 23 supported by brackets 22 which are mounted to the standards of the cutting table. In order to prevent lateral tilting of the frame this is provided with an upper pair of backing rollers 25 rotatably mounted on vertical shafts 24 and cooperating with a track 26 mounted to the lower side of the transverse beams 4 outwardly of rollers 25 as seen from the longitudinal symmetry line of the cutting table. Furthermore, frame 18 is provided with a pair of lower backing rollers 28 rotatably mounted on vertical shafts 27 said rollers cooperating with a lower track 29 mounted on the standards 5 inwardly of the backing rollers 28. The vertical track 23 and the horizontal tracks 26 and 29 continue beyond one end of the cutting table a distance allowing the scrap receiving member 19 to be moved to a position which it is entirely outside one end of the cutting table in order to enable the scrap on the scrap receiving member 19 to be dumped into separate scrap collecting containers 30 arranged at said one end of the cutting table as will be seen particularly in FIG. 4. Tracks 23, 24 and 29 are mounted in a frame 32 arranged between said end of the cutting table and the scrap collecting containers 30. The scrap receiving member 19 supported by frame 18 is pivotally connected to the frame by means of a joint 31 disposed on the part of frame 18 that is adjacent the scrap collecting container 30 and may be brought to a dumping position over the scrap collecting container 30 by power means 40 such as hydraulic or pneumatic power devices connected at one end thereof to the frame and at the other end to the lower side of the scrap receiving member. In order to effect the traversing of the scrap receiving means along the cutting table there is mounted on frame 32 a drive motor 33 to drive a chain wheel 34 one for each of the scrap receiving means. Each of the chain wheels 34 drives and endless chain 35 which runs over a chain wheel at the opposite end of the cutting table, not shown in the drawings. The endless chain 35 is connected to frame 18 of the scrap receiving means 17 as is shown diagrammatically at 36 in FIG. 3.

When the contour cutting operation is going on the scrap receiving member 19 is to be in a position below the contour cutting unit and therefore the scrap receiving means 17 is driven by the drive means 33, 34, and 35 thereof at such speed that the scrap receiving member 19 is always in a position for receiving the cut scrap. The surface of the scrap receiving member thus should have an extension in a plane parallel to the supporting surface of the cutting table which is larger than the extension in the same plane of the fall zone of the cut scrap below the contour cutting unit. Moreover, the surface area of the scrap receiving member 19 preferably should be so large that all cut scrap from the contour cutting of a longitudinal side of the longest plate that can be contour cut on the cutting table can be received on the scrap receiving member. If the scrap receiving member is driven at the same speed as the cutting carriage the cut scrap falling down will form on the scrap receiving member a conical or pyramidal scrap pile having a continuously increasing height. Therefore, the scrap receiving means can be driven at the same speed as that of the cutting carriage only if there is a sufficient clear height between the lower side of the cutting table and the upper side of the scrap receiving member. Since the cutting table usually must be arranged at a normal working level over the floor said clear height usually will be insufficient in order to allow the scrap receiving means to be driven at the same speed as that of the cutting carriage. According to a preferred embodiment of the invention the scrap receiving means therefore is driven at a speed which differs from that of the cutting carriage and thus from the traversing speed of the contour cutting unit. In the embodiment disclosed in the drawings drive motor 33 drives the scrap receiving means intermittently and at a speed which is higher than the speed of the cutting carriage. Thereby there will be obtained during the entire contour cutting operation a relative movement between the contour cutting units 14 and the scrap receiving members 19 providing a distribution of the cut scrap on the surface of the scrap receiving member and accordingly a lower height of the scrap collection. The impulses for starting and stopping the movement of the scrap receiving means will be obtained by limit switches 37 arranged on fittings 38 connected to the vertical carriage legs and projecting therefrom. On the longitudinal edge of the scrap receiving member 19 there are provided adjacent the two end edges of the scrap receiving member abutments 39 for the actuation of limit switch 37. The actuation of limit switch 37 by means of the abutment 39 that is leading as seen in the moving direction will initiate operation of the drive means 33, 34, and 35 to drive the scrap receiving means at a higher speed than that of the cutting carriage and in the same direction as the carriage. When the abutment 39 that is trailing as seen in the moving direction contacts limit switch 37 this will be actuated to interrupt the movement of the scrap receiving means the movement of the cutting carriage however being continued.

The control of the intermittent drive movement of the scrap receiving means may alternatively be obtained by photocells suitably located, or the control may be obtained by means of time dependent switches, timers, by means of which the time for driving the scrap receiving means as well as the interval between the driving periods are controlled.

Figure 4:
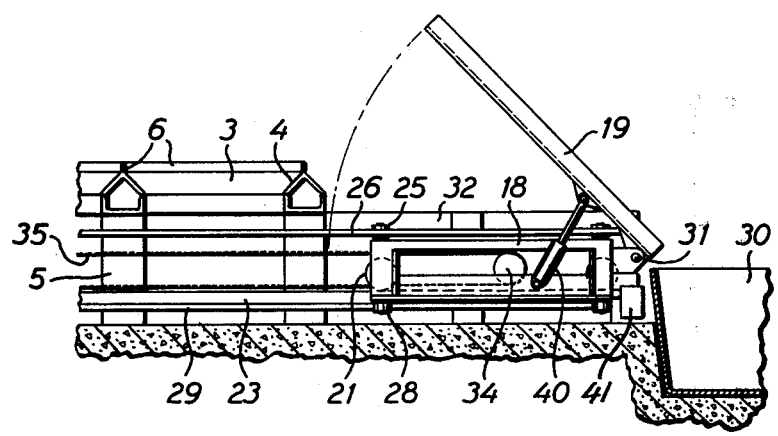
FIG. 4 is a cross sectional view according to line IV — IV in FIG. 2 showing the scrap receiving means in a dumping position over a scrap collecting container included in the plant.

When the contour cutting of a plate has been finished the movement of the cutting portal will be interrupted while the movement of the scrap receiving means will be continued until such means is located outwardly of the end of the cutting table and is in a position for tilting the scrap receiving member over a scrap collecting container 30 as is shown in FIG. 4. The interruption of the movement of the scrap receiving means in a suitable position adjacent the scrap collecting container 30 as well as the initiation of the tilting movement of the scrap receiving member 19 preferably is controlled by one or more limit switches 41, best seen in FIG. 4. The scrap collecting container 30 comprises a big container which holds the cutting scrap from several plates and may service several cutting tables. The insertion of empty scrap collecting containers and the removal of filled containers will be effected by means of a traverse.

When the contour cutting has been finished and the scrap receiving means has been emptied the cutting carriage as well as the scrap receiving means will be returned to the starting position at the opposite end of the cutting table for the contour cutting of another plate.

By means of the device according to the invention the scrap handling problem in contour cutting machines of the kind initially referred to has been solved and the troublesome factor so far provided by the cutting scrap handling in prior art contour cutting plants, which has prevented an extensive automation of all the moments involved in the contour cutting operation has been eliminated.

The invention is not limited to the embodiment described above. It can be modified in several manners within the scope of the accompanying claims. Thus the scrap receiving member may be arranged for a reciprocating movement either in the longitudinal direction of the cutting table or in the transverse direction thereof, or the scrap receiving member may be arranged for continuous or intermittent rotational movement about a vertical axis in order to provide the distribution of the cut scrap on the scrap receiving surface of the scrap receiving member. If the scrap receiving member is arranged for a rotational movement about a vertical axis such axis preferably should be displaced laterally in relation to the vertical line through the contour cutting nozzle of the contour cutting unit.

What we claim is:

1. A device for contour cutting of metal plates comprising a cutting table for supporting horizontally plates to be contour cut, a contour cutting unit movable on a track along the cutting table and having cutting nozzles for contour cutting of the plates; a scrap-receiving carriage for receiving the cut scrap, disposed beneath the cutting table and providing a scrap-receiving surface having a surface area in a plane parallel to the supporting surface of the cutting table corresponding approximately and only to the area in the same plane of the fall zone of cut scrap below the contour cutting unit, said scrap-receiving carriage being movable on a track along the path of and directly beneath the contour cutting unit along the cutting table and remaining directly beneath the contour cutting unit substantially in parallel to the path and moving in the same direction thereof; a scrap-collecting container; drive means for driving said scrap-receiving carriage on the track to and from dumping position at said scrap-collecting container; and means for controlling said drive means to adjust the movement of the scrap-receiving carriage along the path of and in the moving direction of the contour cutting unit according to the movement of the contour cutting unit in order to maintain the scrap-receiving surface area of the carriage within the fall zone of the cut scrap during the entire contour cutting operation, so that cut scrap falls into the scrap-receiving carriage.

2. A device as claimed in claim 1 wherein the drive means comprises control means for automatic control of the movement of the scrap-receiving carriage along its track according to the movement of the contour cutting unit along its track.

3. A device as claimed in claim 2 wherein said control means are adapted to control said drive means for driving said scrap-receiving carriage at a speed which differs from the traversing speed of the contour cutting unit.

4. A device as claimed in claim 3 wherein said control means are adapted to control said drive means for intermittent operation of said scrap-receiving carriage.

5. A device as claimed in claim 3 wherein said control means are adapted to control said drive means for operation of said scrap-receiving carriage at a speed which is variable continuously between a high speed and a low speed which is greater and less, respectively, than the speed of the contour cutting unit.

6. A device as claimed in claim 4 wherein said drive means is adapted to drive said scrap receiving carriage at a speed which is higher than the traversing speed of the contour cutting unit, and is controlled by said control means for driving said scrap-receiving carriage when the leading border of the scrap-receiving surface of said carriage is adjacent the forward front, as seen in the traversing direction, of the scrap fall zone and to interrupt said driving movement when the trailing border of the scrap-receiving surface is adjacent the rearward front, as seen in the traversing direction, of the scrap fall zone.

7. A device as claimed in claim 6 wherein said scrap receiving surface comprises a frame arranged below the cutting table and movable in the longitudinal direction thereof by said drive means, and a tiltable trough-shaped scrap-receiving surface carried by said frame, and wherein said drive means comprises a motor-driven endless transmission member connected to the frame.

8. A device as claimed in claim 7 wherein said drive means comprises a motor of variable rpm.

9. A device as claimed in claim 7 wherein said drive means comprises a motor of constant rpm controlled by said control means for intermittent operation at a predetermined time interval.

10. A device as claimed in claim 1 wherein said scrap receiving carriage comprises a frame arranged below the cutting table, a scrap-receiving surface supported by said frame and arranged for movement in a plane which is substantially parallel to the supporting surface of the cutting table, and drive means for applying to said scrap-receiving carriage a second movement in said plane.

11. A device as claimed in claim 1 wherein scrap receiving carriages are arranged at each side of the longitudinal side of the cutting table.

12. A device as claimed in claim 1 wherein said scrap-receiving carriage is large enough to carry without an intermediate dumping operation, all scrap formed during the contour cutting of a longitudinal side of a plate.

13. A device as claimed in claim 1 further comprising control means disposed near said scrap-collecting container for cooperation with said scrap-receiving carriage to tilt the carriage to a dumping position over the scrap-collecting container.

14. A device as claimed in claim 13 further comprising fluid power means for tilting said scrap-receiving carriage from a substantially horizontal position to a dumping position, and means controlling said power means to be activated in order to perform said tilting movement according to the position of said scrap-receiving carriage in relation to said scrap-collecting container.

* * * * *

UNITED STATES PATENT OFFICE
CERTIFICATE OF CORRECTION

Patent No. 4,067,556  Dated January 10, 1978

Inventor(s) Ralph George Torbjorn Lagerwall et al

It is certified that error appears in the above-identified patent and that said Letters Patent are hereby corrected as shown below:

Face page, Abstract, line 8, "cut" should be --cutting--.
Column 2, line 45, "bedding" should be --floor--.
Column 3, line 8, after "carriage" insert --2--.
line 9, after "carriage" insert --2--.
line 25, "cut" should be --cutting--.

Signed and Sealed this

Fifteenth Day of August 1978

[SEAL]

Attest:

RUTH C. MASON
Attesting Officer

DONALD W. BANNER
Commissioner of Patents and Trademarks